UNITED STATES PATENT OFFICE.

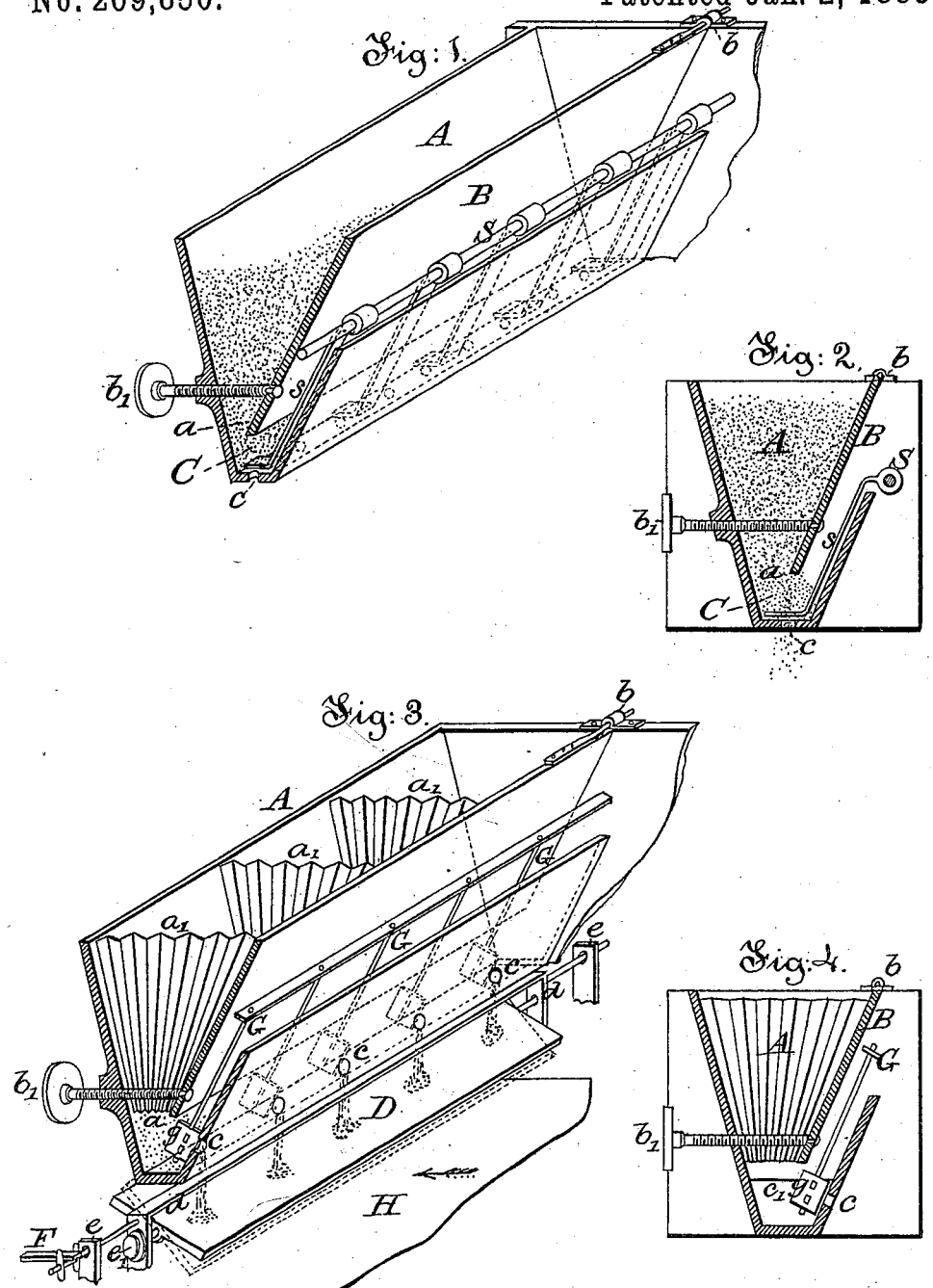

WILLIAM HADDEN, OF BROOKLYN, NEW YORK.

APPARATUS FOR DISTRIBUTING POWDERS UPON SURFACES.

SPECIFICATION forming part of Letters Patent No. 269,850, dated January 2, 1883.

Application filed January 19, 1882. (No model.)

*To all whom it may concern:*

Be it known that I, WILLIAM HADDEN, a citizen of the United States, residing at Brooklyn, in the county of Kings and State of New York, have invented certain new and useful Improvements in Apparatus for Distributing Pulverulent Substances upon Surfaces, of which the following is a specification.

The object of my invention is to feed and distribute dry pulverulent material in variable but regulated quantities; but it is more especially designed for depositing and distributing dry coloring materials or pigments in regulated quantities and in a prescribed relation upon fibrous or textile fabrics or other surfaces traversing beneath it, for purposes of ornamentation. These ends I attain by constructing the feeding-hopper with an upper and lower section, the upper section constituting the main supply-chamber or reservoir-hopper, and having a discharge-opening, preferably adjustable in area, while the lower section or reservoir-hopper is provided with feed-openings in or near its bottom, and with suitable stirrers for agitating its contents, in order to prevent clogging, and to insure uniform discharge or distribution of the contents. The reservoir-hopper is preferably divided into compartments, wherein different-colored substances may be placed without becoming intermingled. The lower or distributing hopper discharges its contents upon a reciprocating inclined shelf placed beneath it, from which shelf the material falls upon the surface which is made to pass beneath it.

The particular subject matter claimed as new will be hereinafter specifically designated.

In the accompanying drawings, which show my improvements embodied in a machine in the best way now known to me, Figure 1 is a perspective view, partly in section, illustrating the construction of one form of the hoppers. Fig. 2 is a vertical transverse section through the reservoir and distributing-hoppers. Fig. 3 is a perspective view, showing another and preferable construction of the hoppers, together with the inclined distributing-shelf and rotating stirrers; and Fig. 4 is a vertical transverse section of the apparatus shown in Fig. 3.

Referring to Fig. 1, A represents the upper or reservoir hopper, which is provided with a row of holes or slots, or, if preferred, with a single longitudinal slot, $a$, through which its contents escape. This opening or series of openings may be varied in area by the usual slide. It may also be varied, in the manner shown in the drawings, by pivoting one side, B, of the hopper by means of a suitable hinge, $b$, and controlling its angle of inclination, and consequently the width of the discharge-opening, by the aid of some well-known form of adjusting device—such, for instance, as a screw $b'$. The lower section or distributing-hopper, C, may be made trough-shaped, as shown in the figures. It is placed below the reservoir-hopper, and is provided with suitable adjustable openings, $cc$, at or near its bottom, which openings may also be made adjustable in area, if desired, in well-known ways.

The object of making use of an upper and lower hopper, as hereinbefore described, is to overcome the tendency of dry pulverulent material to become clogged, and hence to feed irregularly when the ordinary single hopper is employed. By making use of a reservoir and a distributing-hopper combined, in the manner above described, the distributing-hopper contains at any one time a comparatively small quantity of the substance passing through it, and this consequently remains in a loose condition, instead of being compressed and packed, as it otherwise would be by the superincumbent weight of the material above. The relation of the upper to the lower hopper, as will be observed, is such that the material, which has already descended into the lower one, acts in the manner of a seal or valve, and thus prevents the descent into it of more than the quantity desired at one time.

In order to maintain the loose condition of the material, and thereby more certainly insure the regularity and uniformity of the feed, I combine with the distributing-hopper a stirrer, which I have shown in Fig. 1 as a series of scrapers, $s$, made of bent metallic rods, mounted on a bar, S, capable of reciprocating endwise in its bearings. It may also, if preferred, be made to oscillate or rock slightly on its supports. This movement may be effected by hand; but I prefer to do it automatically by means of well-known mechanical devices, not necessary to be shown in the drawings.

The distribution of different colors for ornamenting may obviously be varied by arranging the hoppers in series either one behind the other or abreast of each other or diagonally. I prefer, however, to effect this result by means of partitions $a'$ $a'$, inserted in a single reservoir-hopper, A, as shown in Fig. 3, thus dividing it into several compartments. These partitions are preferably constructed of cloth or flexible material of some kind, so as to admit of the movement of the side of the hopper B, for the adjustment of the discharge-opening $a$. In Fig. 3 I have shown discharge-openings $c$ $c$ as formed in the side of the distributing-hopper, near the bottom. These openings may be separated by stationary partitions, as shown at $c'$, which enables separate colors to be placed in the several compartments of the reservoir-hopper, and permitted to descend and be fed out through the corresponding openings, $c$ $c$, without becoming intermingled.

Directly beneath the discharge-openings $c$ $c$ of the distributing-hopper is placed an inclined shelf, D, which is parallel with the bottom of the hopper and of the same length. This is so arranged as to be capable of a reciprocating motion in the direction of its length, and its inclination is also capable of adjustment. These objects may be conveniently effected by the device shown in Fig. 3, in which $d$ is a frame, within which the shelf D is mounted upon an axis $d'$, attached to it in a longitudinal direction. The shelf D may be turned upon its axis and placed at any desired angle of inclination, and secured by means of a set-screw, $e'$, or other equivalent device. The frame $d$ is mounted in standards $e$ $e$ in such a manner as to be capable of a longitudinal movement to and fro, which may be imparted to it by a reciprocating arm, F, or in any other convenient manner.

I have shown in Fig. 3 the form of stirrer which I prefer to use in practice, consisting of a series of rods, G, provided with blades $g$, opposite the openings $c$. These rods G are mounted in suitable bearings, and are made to turn upon their axes by means of any suitable mechanism.

The function of the inclined shelf D is to more perfectly regulate the distribution of colors upon the fabric passing beneath it, as shown at H, the object being to deposit the material in detached heaps or masses at regular intervals from each other. This result is effected by the organization which has been hereinbefore described. The pulverulent material falling from each one of the feed-openings $c$ $c$ in a small but uniform stream is caught upon the inclined shelf D, and accumulates until a heap of sufficient size is formed, when the whole mass slides bodily down the inclined shelf and over its edge, and is thus deposited upon the surface of the fabric beneath. The size of the heap thus formed will depend upon the inclination of the shelf. The greater the inclination the smaller will be the deposit which is formed before sliding off, and vice versa. This operation is of course much facilitated by the longitudinal reciprocating motion of the shelf, which tends to shake the particles and causes them to slide much more readily than they would otherwise do. By this means a uniform discharge and distribution of the contents of the hopper at regular intervals upon the fabric H is effected.

I claim as my invention—

1. The combination, substantially as hereinbefore set forth, of a reservoir-hopper, a stationary distributing-hopper, and one or more stirrers placed within and adjacent to the outlet of the distributing-hopper.

2. The combination, substantially as hereinbefore set forth, of the reservoir-hopper and the rotating stirrers placed within and adjacent to the outlet of the distributing-hopper.

3. The combination, substantially as hereinbefore set forth, of a reservoir-hopper, a stationary distributing-hopper, a stirrer acting upon the material in the distributing-hopper, and mechanism, substantially such as described, for adjusting the area of the discharge-opening between the reservoir and the distributing-hopper.

4. The combination, substantially as hereinbefore set forth, of a reservoir-hopper divided into compartments, a distributing-hopper into which all the said compartments discharge their contents, a stirrer for acting upon the material in the distributing-hopper, and means for adjusting the area of the opening between the compartments of the reservoir-hopper and the common distributing-hopper.

5. The combination, substantially as hereinbefore set forth, of the reservoir-hopper, the distributing-hopper, and the inclined shelf.

6. The combination, substantially as hereinbefore set forth, of the reservoir-hopper, the distributing-hopper, the inclined shelf, and the means for adjusting the inclination of said shelf.

7. The combination, substantially as hereinbefore set forth, of the distributing-hopper, the inclined shelf, and mechanism for imparting reciprocating motion to said shelf.

In testimony whereof I have hereunto subscribed my name this 17th day of January, A. D. 1882.

WILLIAM HADDEN.

Witnesses:
WILLIAM H. KENYON,
MILLER C. EARL.